United States Patent [19]

Wiesmuller et al.

[11] B 3,995,279

[45] Nov. 30, 1976

[54] LIQUID JET RECORDER

[75] Inventors: Siegfried Wiesmuller, Nurnberg; Helmut Kraus, Erlangen, both of Germany

[73] Assignee: Siemens Aktiengesellschaft, Berlin & Munich, Germany

[22] Filed: Oct. 7, 1974

[21] Appl. No.: 512,964

[44] Published under the second Trial Voluntary Protest Program on February 10, 1976 as document No. B 512,964.

[30] Foreign Application Priority Data

Oct. 10, 1973 Germany ............................ 2350870

[52] U.S. Cl. ..................................... 346/75; 358/75

[51] Int. Cl.[2] ....................... G01D 15/18; B41J 3/04

[58] Field of Search .................. 346/75, 46; 358/75, 358/80

[56] References Cited

UNITED STATES PATENTS

| | | | |
|---|---|---|---|
| 1,709,926 | 4/1929 | Weaver | 358/75 |
| 2,573,143 | 10/1951 | Jacob | 358/75 |
| 3,404,221 | 10/1968 | Loughren | 358/75 |
| 3,416,153 | 12/1968 | Hertz et al. | 346/75 |
| 3,564,120 | 2/1971 | Taylor | 358/75 |

*Primary Examiner*—Joseph W. Hartary
*Attorney, Agent, or Firm*—Hill, Gross, Simpson, Van Santen, Steadman, Chiara & Simpson

[57] ABSTRACT

A liquid jet recorder which includes at least one jet nozzle which is connected to a pressure medium conduit for the ejection of an electrically-conductive recording liquid onto a recording carrier, and which includes at least one control electrode connected to a signal source for modulation of the liquid jet in the context of carrying out spot or point wise recording. The liquid jet recorder of the above-mentioned type, which in a simple manner facilitates that the intensity of a recording color may be controlled within a predetermined range of accuracy. The signal source comprises a number of impulse generators which correspond to the number of desired color steps for each image point, whose impulse sequences are in synchronism, which possess equal impulse amplitudes and may be differentiated from each other with respect to the sensing relationship of the color steps; and including means for connecting the required impulse generator required for the recording of a desired color step on an image point to the associated electrode, while providing an identical recording time for all image points.

5 Claims, 5 Drawing Figures

LIQUID JET RECORDER

FIELD OF THE INVENTION

The present invention relates to a fluid or liquid jet recorder.

DISCUSSION OF THE PRIOR ART

A liquid jet recorder which includes at least one jet nozzle which is connected to a pressure medium conduit for the ejection of an electrically-conductive recording liquid onto a recording carrier, and which includes at least one control electrode connected to a signal source for modulation of the liquid jet in the context of carrying out spot or point wise recording, is described in German Published Specification No. 1,271,754. In this prior art liquid jet recorder, modulation of the liquid jet between a jet nozzle and the recording carrier is facilitated through the intermediary of a suitable voltage which is applied intermediate the recording liquid and the associated control electrode. The known liquid jet recorder thus facilitates that an image, which is constituted of lines, may be inscribed or recorded on the recording carrier. In an embodiment of the known liquid jet recorder for linewise image recording, the recording carrier is stretched or mounted on a rotatably supported drum. The drum is rotated about its longitudinal axis in synchronism with line impulses from an image transmitter, while being concurrently displaced in the axial direction. The unmodulated liquid jet impinges perpendicularly against the recording carrier. The image signal is thereby applied to the control electrode for effecting the linewise image recording.

In the known liquid jet recorder, for the recording of a color image which is constituted of three different basic colors such as, for example, the colors yellow, red and blue, there are provided three jet nozzles. Each image point is provided in a sequential order with the required color component from each jet nozzle.

In the recording of an image point or spot which is formed of the three basic colors, it is necessary that each color be sprayed at its desired proportion. Thus, if for example, an image point should consist of 20% yellow, 30% red and 50% blue color proportions, it is necessary to so control the voltage for each of the three electrodes during the inscribing or recording of the respective color on the image point, to thereby achieve the desired color intensity. For this purpose, it has been proposed in the above-mentioned publication that the high-voltage at the control electrode be correspondingly selected. This, however, has the disadvantage that complex and expensive circuit arrangements must be utilized for effecting variation of the high-voltage at the control electrodes.

SUMMARY OF THE INVENTION

Accordingly, it is an object of the present invention to provide a liquid jet recorder of the above-mentioned type, which in a simple manner facilitates that the intensity of a recording color may be controlled within a predetermined range of accuracy.

The foregoing object is inventively achieved in that the signal source comprises a number of impulse generators which correspond to the number of desired color steps for each image point, whose impulse sequences are in synchronism, which possess equal impulse amplitudes and may be differentiated from each other with respect to the sensing relationship of the color steps; and including means for connecting the required impulse generator required for the recording of a desired color step on an image point to the associated electrode, while providing an identical recording time for all image points. In contrast with the state of the technology, the high-voltage applied to a control electrode for modulation of the liquid jet, in the present invention, remains constant. The intensity modulation is carried out by sensing of the high-voltage and thereby of the liquid jet, whereby the sensing ratio corresponds to the intensity of the recorded color. The inventive liquid jet recorder is applicable as a color recorder without requiring any appreciable additional circuitry requirements.

In a preferred embodiment of the invention, provision is made that the liquid jet recorder be monitored with respect to the satisfactory function thereof so as to prevent that, in an undesirable manner, apparatus components may be struck by the recording liquid and thus made dirty.

BRIEF DESCRIPTION OF THE DRAWINGS

Further details of the invention may now be ascertained from the following description of an exemplary embodiment thereof, taken in conjunction with the accompanying drawings; in which.

DETAILED DESCRIPTION

Figure 1:
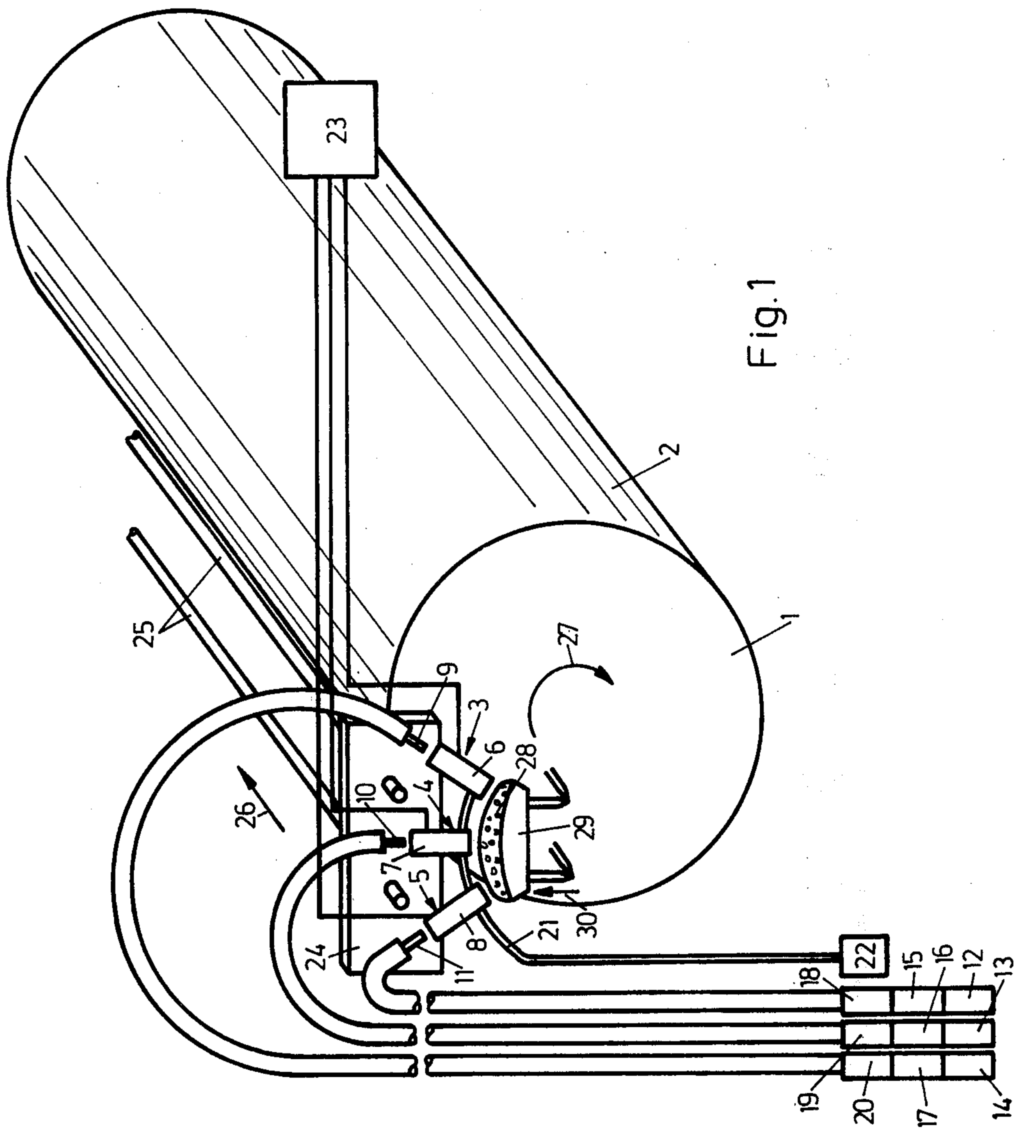
FIG. 1 shows a schematic representation of the liquid jet recorder constructed pursuant to the invention.

The fluid or liquid jet recorder, as shown in FIG. 1, includes a drum 1 on which there is stretched or mounted a recording carrier 2 constituted of a sheet of paper. For recording there are employed three recording or scribing systems 3 through 5 which, respectively, consist of a control electrode 6 through 8, and a jet nozzle 9 through 11. The jet nozzles 9 through 11 project the required recording liquid from supply receptacles 12 through 14 through the use of pumps 15 through 17, through the control electrodes 6 through 8. Between the jet nozzles 9 through 11 and pumps 15 through 17 there may also be, respectively, positioned pressure regulators 18 through 20.

The three recording systems serve for the recording or inscribing of three varied colors, for example, the colors blue, red and yellow, so that a colored image is inscribed on the recording carrier 2. The control electrodes 6 through 8 are passed through by the liquid jet ejected from jet nozzles 9 through 11. These liquid jets disintegrate into drops within the tubularly-shaped control electrodes so that, upon application of a high voltage between the control electrodes and the recording liquid, there is produced a vapor cloud. This vapor cloud precipitates on the control electrodes, the latter of which are formed of a porous material, and are then aspirated by a suction conduit 21 through the intermediary of a suction pump 22. The control impulses for the control electrodes 6 through 8 emanate from a control installation 23. If a control impulse is lacking, then a color point is generated on the recording carrier 2; however, if a control impulse is present, then the flow of liquid between the respective jet nozzles 9 through 11 and the recording carrier 2 is interrupted.

The recording systems 3 through 5 are fastened onto a plate 24 which is longitudinally displaceably supported on two rails 25. The recording systems 3 through 5 and the plate 24, in the position shown in FIG. 1, are illustrated in their inactive position away from the recording carrier 2. The recording is carried out in a manner wherein the plate 24 is uniformly moved along rails 25 in the direction of arrow 26 over the entire length of the drum, while the drum 1 is uniformly rotated in the direction of arrow 27, or reversely. The recording thus is effected in a helix-like path on the recording carrier 2. The signals of the control installation 23 contain the image information.

After the completion of a recording or inscription, the plate 24 together with the recording systems 3 through 5, is again moved back into the illustrated inactive or initial position.

In order that residuals or excesses of the recording liquid may be removed from the recording systems 3 through 5, there is provided a suction pad 28 which is supported in a pan 29, and which is commonly associated with the control electrodes 6 through 8. The pan 29 is movable in the direction of arrow 30 in such a manner, whereby the suction pad 28 may be pressed against the jet outlet sides of the electrodes 6 through 8.

Figure 2:
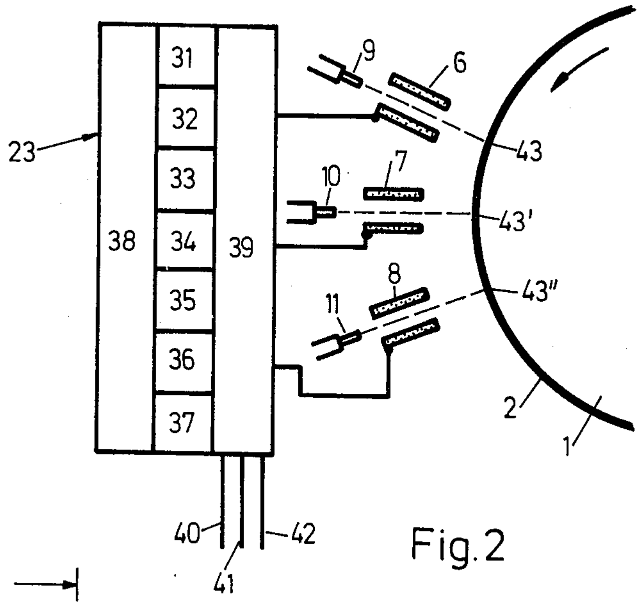
FIG. 2 is a circuitry detail in the liquid jet recorder of FIG. 1.

The control installation 23, pursuant to FIG. 2 includes seven impulse generators 31 through 37, which are synchronized by means of a pulse generator 38. Each of the impulse generators 31 through 37 delivers an impulse sequence whose frequency and impulse amplitude is constant, and whose sensing ratio corresponds to one of seven color increments or steps. The through-connection of the high-voltage impulse generators 31 through 37 to the electrodes 6 through 8 is carried out through the intermediary of a distributor 39, which is controlled by signals in three conductors 40 through 42. The conductor 40 is thereby, for example, associated with the image color blue, the conductor 41 with the image color red, and the conductor 42 with the image color yellow. The intensity of the three colors of an image point is characterized through binary signals in the conductors 40 through 42. Through these signals there may thus be characterized the percentual composition of an image point based on these three image colors. Thus, if there is to be sprayed on an image point 43 proportion of, for example, 20% yellow, 30% red, and 50% blue, then in the illustrated position of the drum 1, first the signal in the conductor 40 characterizes the blue proportion. Those of the impulse generator 31 through 37 which provide this blue component are connected for a predetermined time period to the control electrode 6, and the blue component is sprayed. If the image point 43 has moved to the location 43', then the signal in the conductor 41 characterizes the red component of the image point 43, and the respective impulse generator 31 through 37 is connected with the control electrode 7. The recording of the red proportion is carried out during the same time interval as the recording of the blue component. If the image point has moved further to the location 43'', then the signal in the conductor 42 characterizes the yellow portion of the image point 43, and the respective impulse generator 31 through 37 is connected with the control electrode 8. Also in this instance the recording of the yellow proportion is carried out during the same time period as the recording of the blue and red components.

The signals associated with an image point in conductors 40 through 42 must, in conformance with the sequential recording of the three image colors, timewise offset appear in the conductors 40 through 42. This can be effectuated, when the signals are presented initially at the same time, through corresponding delays of the signal in the conduit 41 with respect to the signal in conduit 40, and the signal in conduit 42 with respect to the signal in the conduit 41. The delay can be effected by means of, for example, slide registers.

In the embodiment according to FIG. 2 it is possible to provide seven color increments for each image color. Furthermore, it is possible to attain a further color increment (color white) in response to continual application of a high-voltage to a control electrode during the recording time for an image point.

If no image color is to be obtained for a particular image point, than for this image point the high-voltage should be constantly maintained at the electrode.

Figure 3:
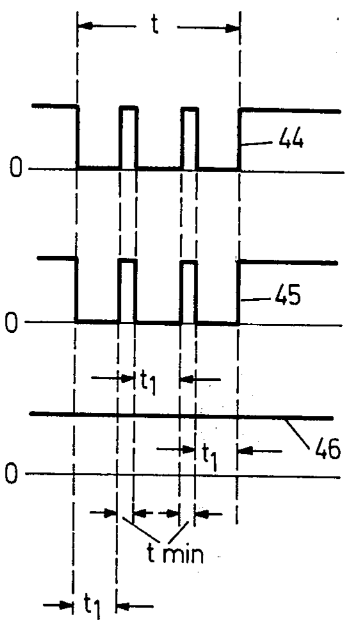
FIG. 3 shows three impulse sequences during the operation of the circuitry of FIG. 2.

FIG. 3 illustrates three impulse sequences which may, for example, be applied to the control electrodes 6 through 8 for the recording of an image point. The $t$ is thereby this particular time period during which the information associated with an image point is applied to the control electrode, namely, the above-mentioned recording time. FIG. 3 has the basic assumption that an image point is to contain 0% of yellow color. In accordance therewith, the impulse sequence 44 is applied to the control electrode 6, and the impulse sequence 45 to the control electrode 7, whereas to the control electrode 8 during the time period $t$ there is applied a constant high-voltage pursuant to line 46. The impulse sequences 44 and 45 represent high-voltage impulses which are applied to the control electrodes during the times $t$ min and which are small in comparison to the intervening impulse pauses. The sensing ratio has its minimum value for the impulse sequences 44 and 45. In accordance therewith, the colors blue and red, which are associated with the impulse sequences 44 and 45, are recorded on an image point at the greatest intensity. Since during the time period $t$ a continuous high-voltage is applied to the control electrode 8, the color yellow is not at all applied to this image point. The sensing of the liquid jet is carried out also during recording of the greatest intensity so as to facilitate monitoring of the function of the recording, as is described in greater detail hereinbelow.

If an image point is to be constituted of the three image colors in another way, then the sensing ratio of the impulse sequences 44 and 45 are correspondingly varied with respect to the desired proportion of the image color. If required, at the locations of the impulse sequences 44 and 45 there may be applied a constant high-voltage during the time period $t$. Further, the constant high-voltage 56 may be replaced by an impulse sequence.

It is important for the present invention that through a number of impulse generators 31 through 37 corresponding to the number of the desired color increments for each image point, each of the image colors can be reproduced on an image point in the required intensity.

From FIG. 3 there may be ascertained that, during a minimum time period $t$ min, at all three electrodes 6 through 8 there is present a high-voltage and therein the time periods $t$ min of the impulse sequence frequency of the generators 31 through 37 correspondingly follow each other (timewise coincidence). From the foregoing there is ascertained that, when a signal is generated, which corresponds to the sum of the voltages at the three electrodes 6 through 8, this signal possesses an impulse shape in which the impulse amplitude exceeds a predetermined value at undisturbed operation during a minimum time period, and the pauses between two impulses do not exceed a maximum value. This fact can be utilized for monitoring disturbances of the liquid jet recorder, in accordance with FIG. 4.

Figure 4:
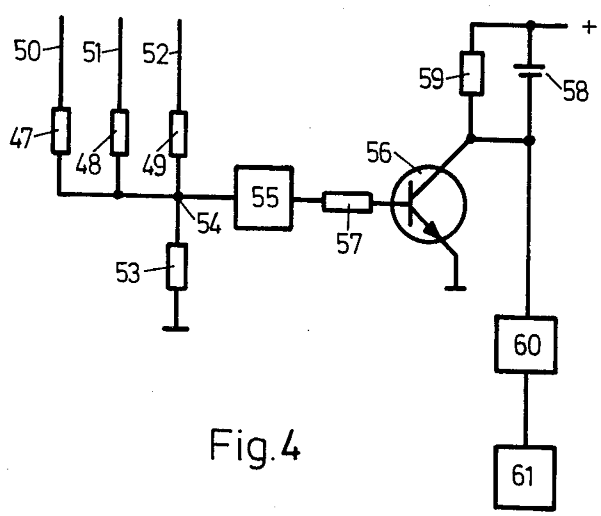
FIG. 4 shows a circuit diagram of a monitoring installation used in connection with the recorder.

In FIG. 4 there are illustrated three resistances 47 through 49 to which there are transmitted signals through conductors 50 through 52, which correspond to the voltages at the control electrodes 6 through 8. The resistances 47 through 49 are high-ohmic in comparison with the summing resistance 53, so that a voltage is applied to location 54 which corresponds to the sum of the three voltages in the conductors 50 through 52. This voltage is transmitted to threshold sensor 55 which connects a transistor 56 through a coupling resistance 57 for as long as the voltage at its input, in effect, at location 54, exceeds a predetermined reference value. During an undisturbed operation the voltage at input location 54 of the threshold sensor is, at least during the times $t$ min, above the reference value and the spacing between the voltage impulses does not exceed the time period $t_1$. The connected transistor 56 effects the charging of a condenser 58. As soon as the high-voltage is lacking at one of the electrodes 6 through 8, the impulses at the input of the threshold sensor 55 no longer reach the required magnitude for effecting a reversal. The condenser 58 may then be discharged through the resistance 59 more strongly than for undisturbed operation, so that after completion of a predetermined time period, which is characteristic of the presence of a disturbance (for example, $2xt_1$, there reverses a Schmitt-trigger 60, since then the voltage at the condenser 58 drops below a predetermined value. This will control a switch-off device 61, which deactivates the liquid jet recorder. During undisturbed operation, the condenser 58 is always again timely recharged before the level of the Schmitt-trigger is reached.

The circuit arrangement according to FIG. 4, in a simple manner, facilitates the monitoring of the operation of the liquid jet recorder since there is tested if a high-voltage is applied to all three electrodes 6 through 8 within predetermined time spacings. In this manner it can be prevented that, due to the lack of a high-voltage as a result of disturbance, the recording liquid can be sprayed in the apparatus or onto the drum in an undesired manner.

The invention is described in connection with a color recorder in which a color image is constituted of three basic colors. However, it is also applicable for use with one jet nozzle for the creation of black-white image. Also in this instance the intensity control of the liquid jet is provided through selection of the particular suitable impulse generator 31 through 37.

Figure 5:
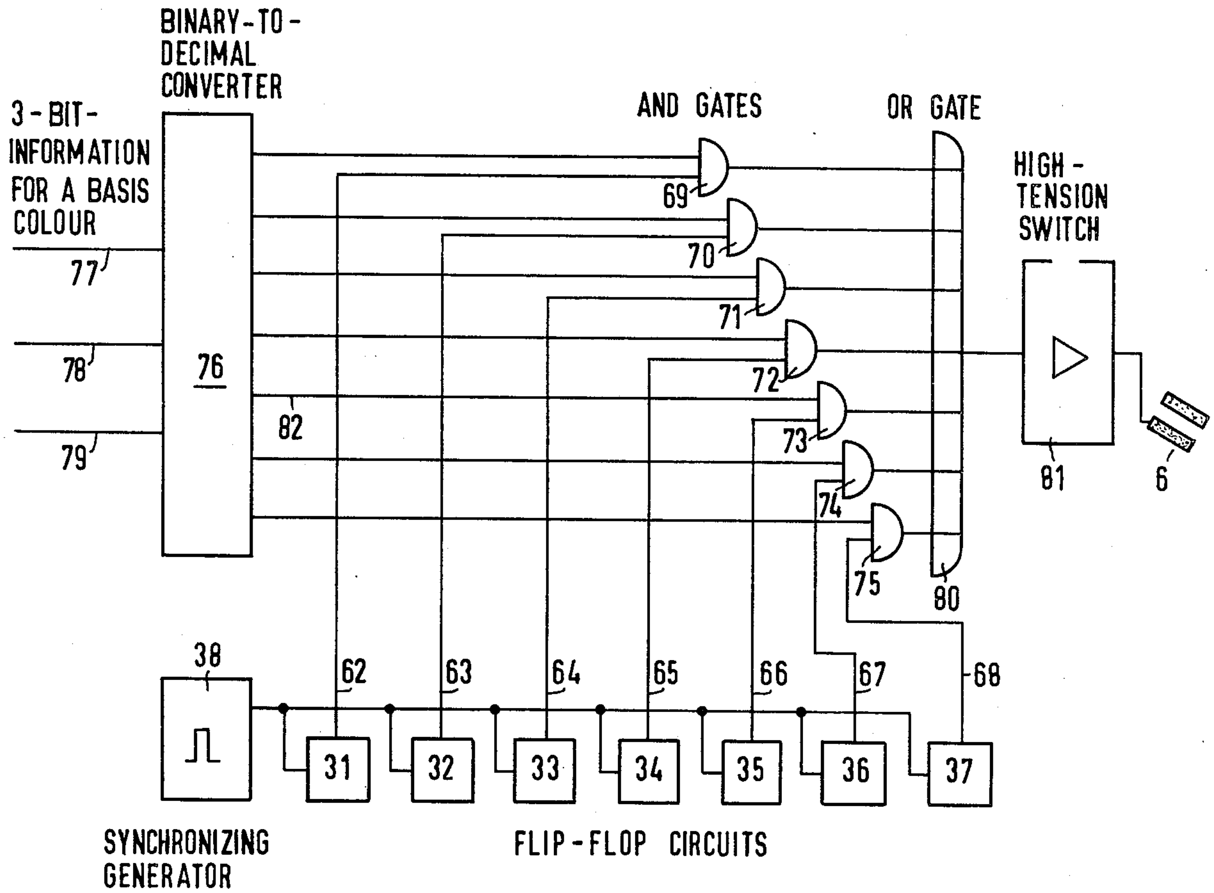
FIG. 5 illustrates a circuit diagram of a control installation for the liquid jet recorder of FIG. 1.

The construction of the control installation 23 may be more closely ascertained from FIG. 5. Thus, FIG. 5 illustrates the impulse generators 31 through 37, which are monostable stepping oscillators or flip-flop circuits. These flip-flop circuits are jointly reversed by a beat generator 38. They possess varied time constants and thereby reverse back in accordance with different times, as measured from the end of a beat impulse. Thereby, at the outputs 62 through 68 of the flip-flop circuits 31 through 37 there are obtained impulse sequences which possess the same frequence but different sensing ratios.

In FIG. 5 there is illustrated the control passageway for only the basic color blue. The control passageways for the basic colors red and yellow are constructed in the indentical manner as this illustrated passageway. The output impulses of the flip-flop circuits or stepping oscillators 62 through 68 are transmitted to the inputs of AND-gates 69 through 75. The other inputs of these AND-gates are connected to a binary-decimal converter 76 which possesses three input conductors 77 through 79, to which there is applied the 3-bit information for a basic color. The three input conductors 77 through 79 correspond to the conductor 40 in FIG. 2. At the inputs 77 through 79 there is applied a 3-bit signal which characterizes the intensity of the basic color blue for an image point. This signal is so processed in the binary-decimal decoder 76 so that a signal appears at one of the seven outputs of the binary-decimal decoder 76. The seven outputs of the binary-decimal decoder 76, in effect, correspond to the seven intensity increments for an image and a basic color.

The AND-gates 69 through 75 have an OR-gate 80 connected thereto, which controls a high-voltage switch 81, the latter of which is connected to the electrode 6.

It is assumed that the 3-bit information at the inputs 77 through 79 corresponds to the output signal at the output 82. In accordance therewith, the AND-gate 73 is opened and the impulse sequence of the flip-flop or stepping oscillator 35 is transmitted through the OR-gate 80 to the high-voltage switch 81. During the time period $t$ (FIG. 3) the impulse sequence delivered by the flip-flop or stepping oscillator 35 is applied to the high-voltage or high-tension switch 81, and the color blue is recorded on an image point with an intensity which is determined through the sensing ratio of the impulse sequence of the flip-flop circuit 35.

Also the basic colors red and yellow each have a binary-decimal decoder associated therewith, which is connected together with AND-gates and OR-gate in the above described manner. Each of the further OR-gates has, respectively, connected thereto a high-voltage or tension switch. Each of the two further high-voltage conductors controls one of the electrodes 7 and 8. The output conductors 62 through 68 are, in effect, conveyed in parallel to the inputs of two further groups of, respectively, seven AND-gates, whose other inputs each lead to a further binary-decimal decoder.

While there has been shown what is considered to be the preferred embodiment of the invention, it will be obvious that modifications may be made which come within the scope of the disclosure of the specification.

What is claimed is:

1. In a liquid jet recorder having at least one jet nozzle; a pressure means conduit connected to said jet nozzle for causing the latter to propel a jet of an electrically-conductive recording liquid onto a recording carrier; and at least one control electrode connected to a signal source for modulating said liquid jet in the sense of effecting a point wise recording, the improvement comprising: a plurality of impulse generators in said signal source in conformance with the number of desired color increments for each image point on said recording carrier, said impulse generators having synchronous impulse sequences, equal impulse amplitudes and differentiated from each other with respect to the sensing ratios of said color increments; and means for connecting the impulse generator required for recording the desired color increment on an image point to the electrode associated with said image point for a recording time period equal for all image points.

2. A recorder as claimed in claim 1, comprising a plurality of said jet nozzles ejecting differently colored liquid jets for forming a color image; a plurality of said control electrodes corresponding to the number of image colors; and a distributor means being connected between said impulse generators and said control electrodes, said distributor means effecting the connection between said impulse generators and said control electrodes in dependence upon input signals characterizing the color composition of an image point.

3. A recorder as claimed in claim 2, comprising means for applying a constant shut-off voltage to said control electrode associated with said image point and applying an impulse sequence to said control electrode for recording the color increment at maximum color intensity, at which the sensing ratio has a minimum value.

4. A recorder as claimed in claim 3, comprising a summing circuit receiving signals in conformance with the impulse sequences transmitted to said control electrodes, said summing circuit forming a summing signal in conformance with the sum of all synchronous shut-off impulses for the liquid jets; and a switching arrangement for said recorder receiving said summing signal adapted to deactivate said recorder when said summing signal fails to attain a reference value within a predetermined time interval.

5. A recorder as claimed in claim 4, said switching arrangement including a threshold sensor controlled by said summing signal, said threshold sensor imparting a charging voltage a condensor upon reaching said reference value and interrupting said charging when the voltage drops below said reference value at the input thereof.

* * * * *